Sept. 13, 1960  L. S. GUARINO  2,952,405
AIRCRAFT GROUND TRACK, INTERCEPTION AND PATTERN
COMPUTER AND CONTROL SYSTEM Filed Dec. 23, 1953  4 Sheets-Sheet 1

INVENTOR.
LOUIS S. GUARINO
BY
ATTORNEYS

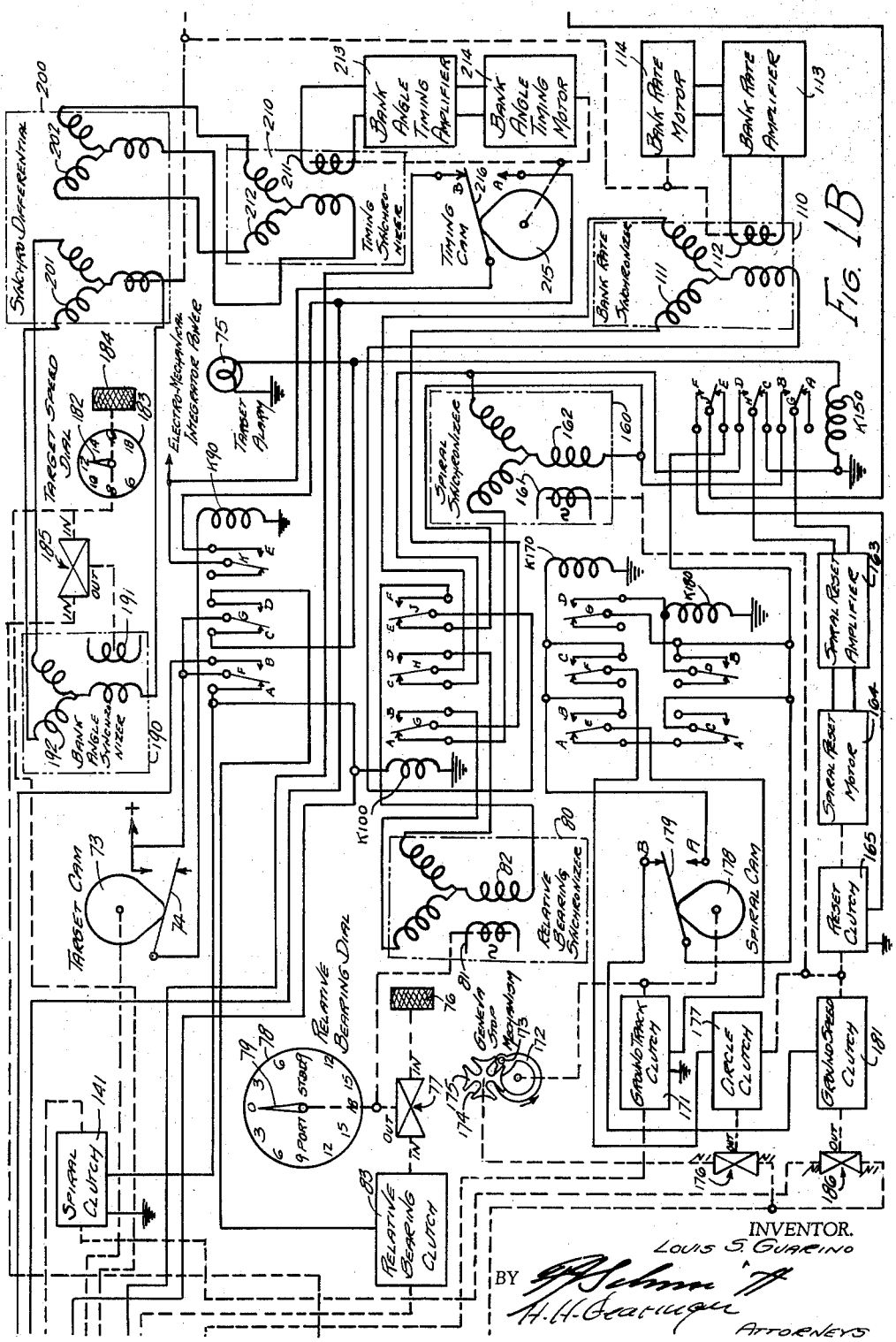

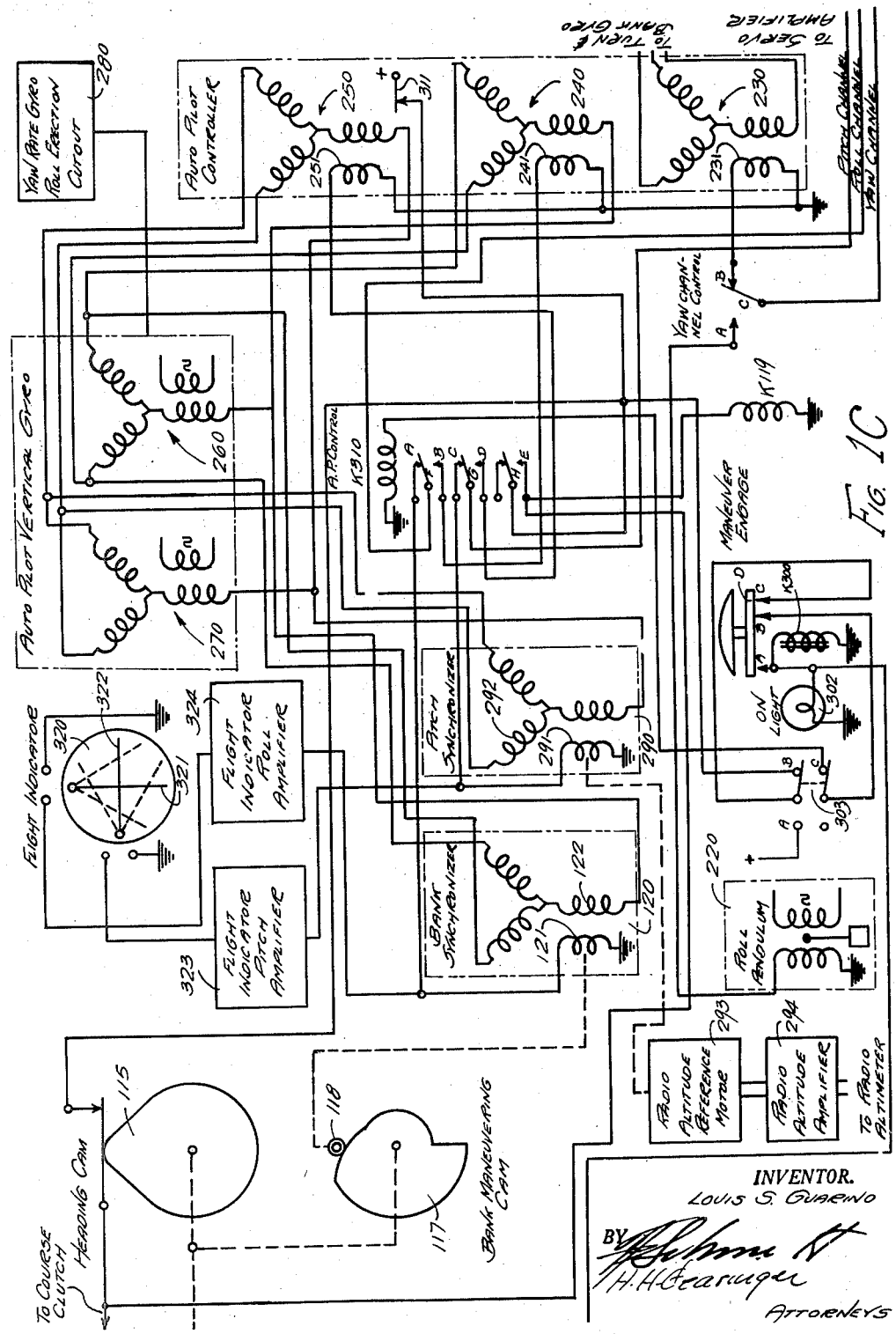

Sept. 13, 1960 L. S. GUARINO 2,952,405
AIRCRAFT GROUND TRACK, INTERCEPTION AND PATTERN
COMPUTER AND CONTROL SYSTEM
Filed Dec. 23, 1953 4 Sheets-Sheet 4

INVENTOR.
LOUIS S. GUARINO
BY
ATTORNEYS

United States Patent Office 2,952,405
Patented Sept. 13, 1960

2,952,405

AIRCRAFT GROUND TRACK, INTERCEPTION AND PATTERN COMPUTER AND CONTROL SYSTEM

Louis S. Guarino, Yeadon, Pa., assignor to the United States of America as represented by the Secretary of the Navy Filed Dec. 23, 1953, Ser. No. 400,155

1 Claim. (Cl. 235—61)

(Granted under Title 35, U.S. Code (1952), sec. 266)

The invention described herein may be manufactured and used by or for the Government of the United States of America for governmental purposes without the payment of any royalties thereon or therefor.

This invention relates to aircraft navigation aids and more specifically to a computer and flight programmer to be used in conjunction with an automatic pilot on a patrol aircraft.

It often becomes necessary for an aircraft to physically locate a moving target which has been discovered by radar or similar detecting means.

One of the techniques employed requires that the aircraft proceed to the point at which the target was discovered, then fly in a programmed spiral pattern to a circle of predetermined radius and then continue to fly around the last mentioned circle as the target is sought visually and by the use of detection aids. Because of the limitations of some of the detecting gear which is available for use on aircraft, all of these maneuvers must be performed at relatively low altitudes of between 50 and 100 feet. The nature of these tactics places many complex and simultaneous demands on the pilot which renders their use extremely difficult if not impossible in cases where there is a single human pilot. In addition, the interception flight and spiral maneuver must be made relative to the ground, which further complicates the picture by introducing windage effects among the variables which must be considered.

In view of these facts, the present invention was developed to provide automatic means to aid the pilot in maintaining the programmed patterns. The automatic programmer and computer does this in two ways. First, it constantly indicates range and bearing to the target and will control the aircraft to intercept that target and second, it will control the flight of the aircraft according to a predetermined, prescribed pattern after the target point or point at which the target was last sighted, is reached.

Since the interception and programmed flights are performed at altitudes of between approximately 50 and 100 feet, maintenance of altitude becomes an important consideration, particularly during maneuvers. The lift of an airplane during a turn is approximately proportional to the cosine of the bank angle. It can be seen, therefore, that as the bank angle increases the lift will decrease. To prevent serious loss of lift during maneuvers, the maximum bank angle permitted by the programmer and computer is automatically limited to a safe value. This means that effective control of the aircraft's flight in a vertical plane can be adequately affected through elevator control from an altitude sensing element, such as, for example, a radio altimeter.

To provide more effective turn coordination through an automatic pilot controlled by the programmer and computer, the coordinated turn controlling elements are changed from bank angle and yaw rate to bank angle and roll dynamic vertical. Turn coordination becomes continuously automatic irrespective of airspeed through use of a roll pendulum permitting the flight path of the airplane in the horizontal plane to be effectively controlled by the bank angle variable alone.

The programmer and computer signals are fed to a visual flight indicator whose vertical pointer will indicate a deviation proportional to the error in azimuth from the programmed pattern while its horizontal pointer shows error in altitude. The pointers will remain in their respective center positions when the aircraft is correctly oriented with the programmed pattern.

The invention will be described in the ensuing pages as coupled to and controlling an automatic pilot but it can be clearly seen that manual flight guided by the indicator deviations or automatic pilot controller are also possible.

It is an object of this invention to provide means for automatically controlling the flight of an aircraft to a point whose initial range and bearing are known.

It is also an object of this invention to control the aircraft according to a prescribed pattern of flight after the given point has been intercepted.

To continuously compute and provide for input to an automatic pilot an error signal proportional to the deviation of the aircraft from the interception course or from the prescribed flight is also among the objects of this invention.

Another object is the control of a flight indicator to continuously indicate for visual observation the degree and direction of deviation of an aircraft from a programmed pattern of flight.

Still another object of the invention is to compute at all times the ground track and ground speed of a maneuvering aircraft.

A further object involves a novel technique for negotiating coordinated turns through an automatic pilot utilizing as controlling quantities bank angle and roll dynamic vertical.

This invention has for an object the development of an electro-mechanical integrator for producing an integrated mechanical quantity varying in accordance with the magnitude of a selected input signal.

Other objects and many of the attendant advantages of this invention will be readily appreciated as the same becomes better understood by reference to the following detailed description when considered in connection with the accompanying drawings wherein:

Figures 1A, 1B and 1C compose Figure 1 which is an electromechanical schematic of the computer and programmer showing controls and input connections to an automatic pilot with some of the components shown in block form;

Figure 1A:
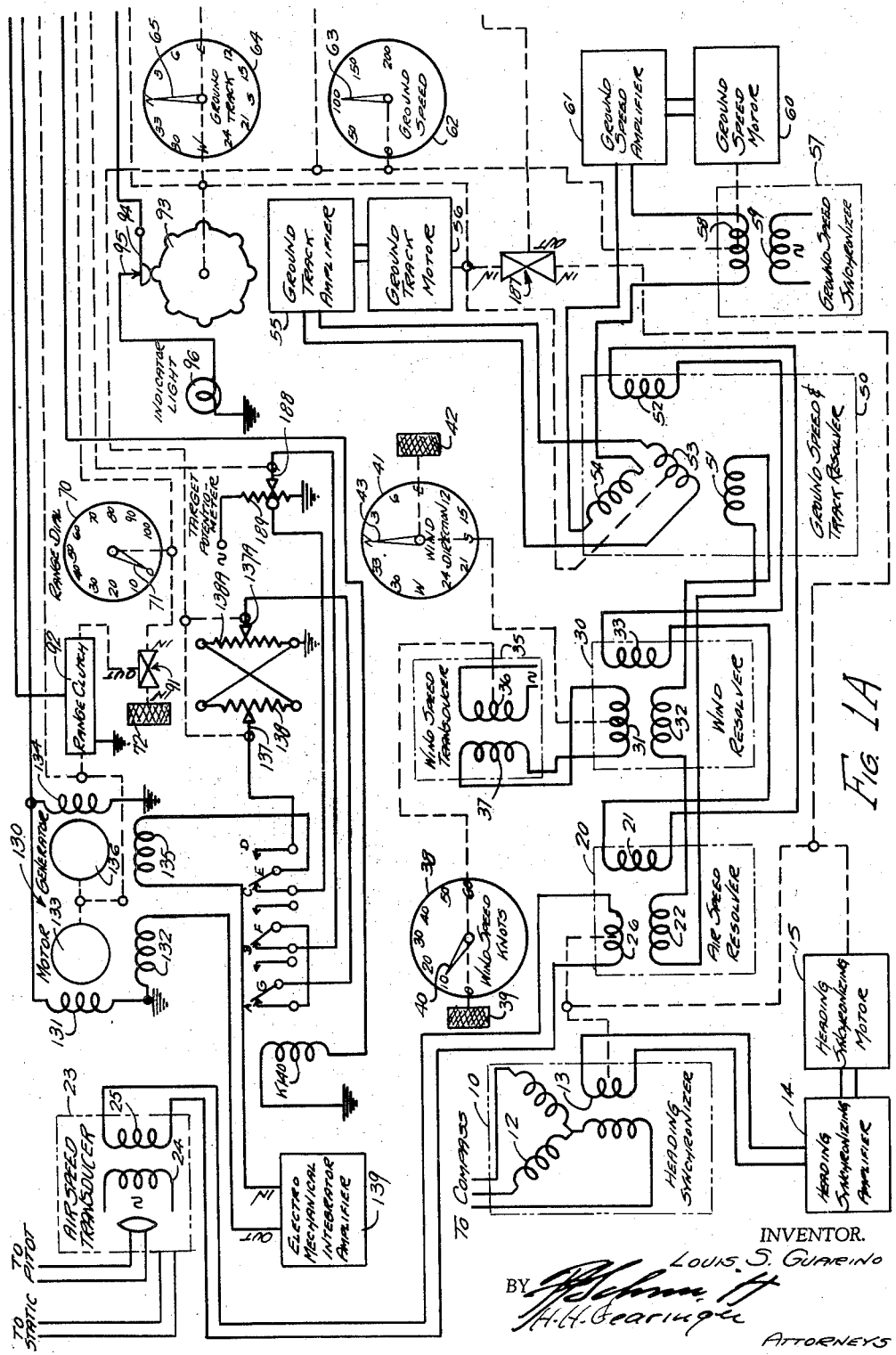
Figure 2:
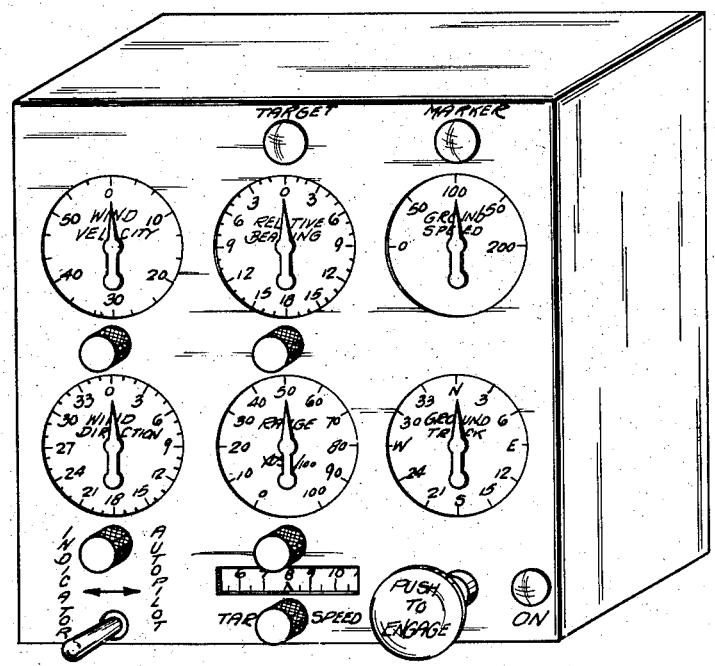
Figure 2 illustrates the physical configuration of the system in its case.
Figure 3:
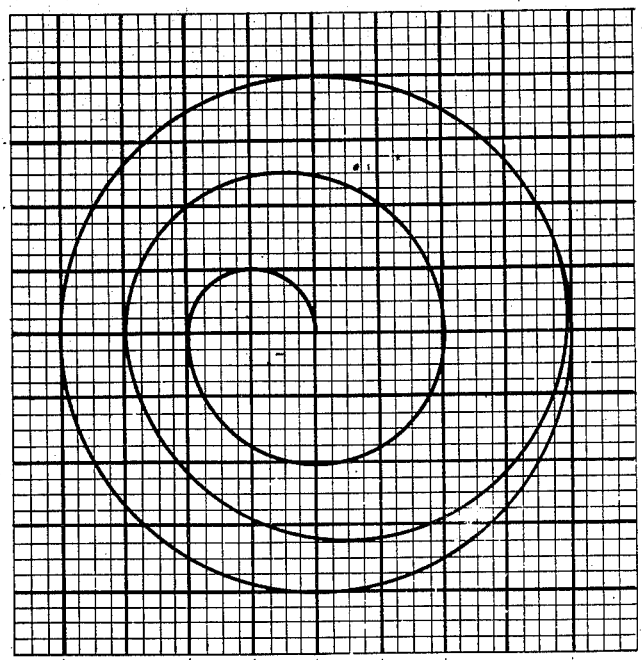
Figure 3 is an example of the programmed flight pattern which the aircraft follows after reaching the interception point.

In the drawings mechanical linkages are shown by dotted lines and electrical leads are designated by solid lines.

Switch, cam and relay positions are shown in the conditions which would prevail when the automatic pilot controller is in detent, the indicator-automatic pilot selector switch is in automatic pilot position, the maneuver engage switch is in closed position, and the aircraft has reached the point of last contact with the target, completed the spiral pattern flight around said point and is flying about the outer circle of the programmed pattern.

The programmer and computer may be employed as a navigational aid or control in any circumstance where it is desired to fly from one point to another point whose relative bearing and range from the first point are known and the programmed pattern flown after the point of interception is reached may be made to suit any desired condition by slight modification of the system.

SYSTEM OPERATION—GENERAL

For the purposes of description, the system may be divided into a ground track computer, an interception computer and a spiral computer.

The ground track computer utilizes inputs of compass heading, airspeed, wind speed and wind direction to compute ground speed and ground track of the aircraft at all times.

The interception computer is manually set according to the initial bearing and range of the target and thereafter indicates the cumulative range and bearing of the target and controls the airplane heading when the system is in operation until the target sight point has been reached. Input to the interception computer is obtained from the ground track computer.

When the aircraft is over the point of last radar contact with the target according to the interception computer, control of the aircraft is assumed by the spiral computer. In this section of the system are generated signals which cause the airplane to fly in two half-circles and then in an expanding spiral configuration merging into a circle of a diameter determined according to the estimated target speed. The plane then continues to fly in this circle.

The control signals from the interception and spiral computers may be fed to an automatic pilot or to a flight indicator to indicate deviation from the desired course to a human pilot who will maneuver accordingly either through manual control or by manipulating the controller of an automatic pilot.

DETAILS OF THE SYSTEM

The ground track computer

Referring more specifically now to the drawings it will be seen that the numeral 10 indicates a heading synchro whose stator windings 12 are connected to a compass indicating aircraft heading to provide one of the inputs to the ground track computer. The voltage impressed on the heading synchro rotor 13 is fed to a heading synchro amplifier 14 which controls a heading synchronizing motor 15. The motor 15 drives the rotor 13 to a null position and simultaneously positions the rotor 26 of an airspeed resolver synchro 20. An airspeed sensing pitot (not shown) influences the secondary signal of the winding 25 of an airspeed transducer 23 whose primary 24 is connected to a source of alternating current energy. The voltage at the winding 25 is directly coupled to the terminals of the rotor 26 in the airspeed resolver synchro so that the sine-cosine wound stators 21 and 22 of the airspeed resolver have impressed on them signals corresponding to the East-West, North-South components of airspeed.

To obtain an indication of ground speed and track, since it will be necessary to fly with relation to a target on the ground, wind components are introduced into the computations through a wind resolver synchro 30. Wind speed is set by moving the pointer 40 of dial 38 through manipulation of wheel 39. This action also produces rotation of rotor 36 of wind speed transducer 35 which is also connected to wheel 39. The rotor 36 is supplied with an alternating current voltage so that its movement introduces a variation in the voltage impressed on the stator 37. This varying signal is directly coupled to the wind resolver synchro rotor 31 which is on a common shaft with the pointer 43 of a wind direction dial 41 and an operating wheel 42. Therefore, as dial 41 is set to correctly indicate wind direction, the voltage on sine-cosine wound stator windings 32 and 33 is affected to provide voltages representative of East-West, North-South components of wind speed. Windings 32 and 33 are connected in series with the corresponding stator windings of resolver 20 to produce sum voltages representing East-West, North-South components of ground speed. These voltages are placed on stator windings 51 and 52 of ground speed and track resolver and converter 50 which has a sine-cosine wound rotor comprising windings 53 and 54. By keeping rotor 53 at null, rotor 54 can be made to generate a voltage which indicates the absolute value of ground speed. This is done by feeding the signal from rotor 53 to a ground track amplifier 55 which controls the operation of a ground track motor 56 which in turn is coupled to and controls the rotative position of rotor 53 and of the pointer 65 on ground track indicator 64. Rotor winding 54 is connected in series in a bucking sense with rotor 58 of a ground speed synchro 57, the stator 59 of which is connected to a source of alternating current voltage. The difference signal resulting from the subtraction of the voltages on rotors 54 and 58 is conducted to ground speed amplifier 61 whose output drives ground speed motor 60 mechanically connected to the shaft of rotor 58 which is turned to cancel the error or difference signal. This also sets the pointer 63 of ground speed indicator 62 which is on a common shaft with rotor 58. Resolver 50 also converts from Cartesian coordinates to polar coordinates.

The true ground speed and ground track are continuously shown on the ground speed and ground track indicators of the computer and programmer.

The interception computer

The interception computer is initially set to indicate the range and bearing of a target discovered by radar or other means and then utilizes information provided by the ground speed computer to keep the aircraft headed toward the point where the target was discovered and to indicate when that point is reached. The interception computer at that time also shifts control over the aircraft to the spiral computer and programmer which causes the plane to fly according to a predetermined pattern to attempt to effect actual physical location of the target which can be presumed to be moving at a known estimated rate.

In the interception computer, the pointer 71 of a range dial 70 is driven through a differential 91 to indicate the initial target range by rotating wheel 72. This action also positions target cam 73 which is on a common shaft with the pointer so that the high point on the cam will be in a position to open normally closed switch 74 when the pointer is rotated back to zero range indication. Wheel 76 is operated to set initial target relative bearing on relative bearing dial 78 as indicated by pointer 79 through differential 77. The output of differential 77 is mechanically linked to control the rotative position of rotor 81 of relative bearing synchro 80. This introduces into the stator winding 82 a signal corresponding to a course which would intercept the target.

When the range to the target is other than zero, relay K90 will be energized from a power source through switch 74. Relays K100 and K140 will be in their de-energized positions; range clutch 92 will be energized through contacts B, F of relay K90, completing a mechanical connection from the output shaft of electromechanical integrator 130, differential 91 and target cam 73; relative bearing clutch 83 will be energized through contacts D, G of relay K90 completing a mechanical linkage from the shaft or rotor 53 of the ground speed and track resolver-converter to differential 77 and rotor 81 of the relative bearing synchro; and power is supplied to the electro-mechanical integrator through contacts E, K of relay K90.

Under these conditions a bank rate synchro 110 has its stator connected to the stator of the relative bearing synchro, thereby inducing a signal in rotor 112 which is fed to a bank rate amplifier 113 that controls the operation of bank rate motor 114 which drives rotor 112 to its null signal position. The output shaft of motor 114 is mechanically connected to heading cam 115 and bank maneuvering cam 117. The bank maneuvering cam controls the position of cam follower 118 which in turn determines the rotative position of rotor 121 of bank synchro 120. The stator 122 of synchro 120 is connected to roll synchro 260 of an automatic pilot vertical gyro in parallel with an automatic pilot controller roll synchro 240. If the required bank rate to turn to the interception course is greater than 30° the error signal fed up to the bank synchro will remain at 30° due to the construction of the bank maneuvering cam. This bank angle limitation is necessary as a safety precaution to protect against dangerous loss of lift at the low altitudes at which the aircraft is being flown during these maneuvers. As the aircraft turns to its new course, the new ground track information is fed back mechanically from the ground speed and track resolver and converter to the relative bearing synchro through the relative bearing clutch 83 to reduce and ultimately remove the error signal.

Whenever the heading error is other than zero, heading cam 115 is in a position which allows switch 116 to open, deenergizing the automatic pilot course clutch (not shown) and deenergizing relay K119 so that contact C thereof closes a circuit through contact A and opens a circuit through contact B. This shifts control authority for the automatic pilot yaw channel from the yaw rate synchro 240 to a roll pendulum 220 thus providing for fully coordinated turns with bank rate as the only variable and permits maneuvers without disturbing automatic pilot synchronization.

During this time the movable arm 137 of range potentiometer 138 is positioned through a mechanical connection with ground speed motor 60 in accordance with the ground speed magnitude. The range potentiometer is connected to a source of alternating current voltage and the signal tapped off by the contact 137 is conducted by an electrical circuit completed by contacts D, E of relay K140 to the input of an electro-mechanical integrator amplifier 139. The electro-mechanical integrator 130 consists of a motor 133 and a generator 136 on a common shaft and the amplifier 139. Power is supplied from a power source to the field windings 131 and 134 respectively of the motor and generator and current for armature 132 of the motor is provided by the amplifier in accordance with an input signal from the range potentiometer. As the motor turns it causes generator 136 to produce a voltage in armature 135 bucking the input to the amplifier. This in turn cuts off the motor armature current and the motor and generator stop. Since there is then no bucking voltage, the amplifier is again provided with a signal which produces an output that drives the motor and the cycle is repeated. On a long time basis there is produced a shaft rotation of the motor-generator combination which is proportional to the amplitude of the input signal. This rotation is applied through the range clutch and differential 91 to rotate the range dial and target cam. When the target cam reaches the position corresponding to zero range it opens switch 74, which is normally closed, cutting off power to relay K90. As a result, power is applied through A, F of relay K90 to energize relays K100 and K140 and spiral clutch 141; range clutch 92 is deenergized; target alarm light 75 and relay K150 are connected to a source of power through contacts C, G of relay K90 and the circuit to the electro-mechanical integrator through relay K90 is opened.

The spiral computer

The spiral pattern comprises two half circles flown at constant bank angles and whose diameters, therefore, depend on airplane speed. The first semicircle is flown from the interception point and the second begins at the end of the first and is flown at half the bank angle of the first, thereby describing a semicircle of twice the diameter of the first since the speed of the airplane may be considered constant. At the end of the second half circle, the pattern merges into a true spiral whose center is at the interception point and whose rate of expansion is dependent upon the relative aircraft speed and estimated target speed. Expansion continues until a time when the aircraft is at a radius which will describe a circle defining the outer limit of travel of a target moving at the estimated speed. The pattern then becomes a circle of said radius about which the aircraft continues to fly as attempts to locate the target are continued.

The bank rate synchro stator 111 is connected to stator 162 of spiral synchro 160 at contacts A, G; C, H and E, J of relay K100 and the relative bearing clutch 83 is deenergized as zero range is reached. As will hereinafter be explained, rotor 161 of spiral synchro 160 has been rotated by spiral reset motor 164 so that it signals a 30° turn which is ordered by the bank rate synchro through cam 117 as explained in connection with relative bearing. The stator 162 of the spiral synchro is electrically connected to stator 111 of the bank rate synchro through contacts A, G; C, H and E, J of relay K100. At the instant of closing relay K150, ground track clutch 171 is energized through contacts A, E of relay K170, contacts A, C of relay K180 and contacts E, J of relay K150 and as the aircraft goes into its 30° bank driving wheel 172 of a Geneva stop mechanism rotates in the direction of the arrow bringing driving pin 173 to a position wherein it drives escapement disc 175 through 90° and emerges just free of one of the slots 174. Spiral cam 178 is driven by the ground track clutch so that the high spot of the cam moves away from switch 179 permitting the switch to close a circuit through its contact A. Relay K170 is energized from a circuit completed through contact A of switch 179; contacts E, J of relay K150; contacts A, D, C of relay K300; contact B of switch 303 and detent switch 311 in the automatic pilot controller. When the system is set for indicator operation the circuit is through contact A of switch 303 to a power source. In its energized condition relay K170 completes circuits activating ground track clutch 171 through contacts B, E and circle clutch 177 through contacts C, F. It also supplies energizing current to relay K180 through contacts D, G. Relay K180 then remains energized through its holding contacts B, D until relay K90 is again energized by resetting the target cam.

The position of rotor 161 of the spiral synchro is modified in accordance with the computed windage effect through the following means. True aircraft heading represented by shaft rotation of the heading synchronizing motor 15 is mixed at mechanical differential 187 with ground track as represented by shaft rotation of ground track motor 56 so that the output of the differential is a shaft rotation indicative of windage effect. The output of the differential 187 is applied through differential 176 and the circle clutch to rotor 161 introducing a correction so that the path flown by the aircraft is a semicircle with respect to the ground.

Meanwhile ground track shaft rotation from ground track motor 56 is also applied through the ground track clutch to a spiral cam 178 and to the driving wheel 172 of a Geneva stop mechanism with a ratio such that the wheel 172 makes a complete revolution in the direction of the arrow during 180° rotation of the ground track shaft. Near the end of its revolution, driving pin 173 of wheel 172 engages one of the slots 174 of the escapement disc 175 turning it through 90°. This rotation of the escapement disc passes through differential 176 and the circle clutch to position the rotor of spiral synchro 160 so that a 15° bank is ordered. Since the aircraft speed may be considered constant, this will result in the airplane's flying a semicircle of twice the diameter of the first.

At the end of the second half circle flown by the airplane, the Geneva stop mechanism and spiral cam will be in the position shown in the drawing with the driving pin 173 just ready to enter one of the slots 174. The spiral cam will have opened the circuit through contact A of switch 179 and closed the circuit through contact B, thus energizing ground speed clutch 181, deenergizing circle clutch 177 and ground track clutch 171 and permitting relay K170 to return to its unoperated condition. This leaves the rotor 161 of the spiral synchro rotated to the position in which it signals a 15° bank and windage effect correction continues to be fed to said rotor via a path comprising differential 186 and the ground speed clutch.

At some time prior to this, pointer 182 has been positioned by means of wheel 184 to indicate estimated target speed on dial 183. The movable arm 188 of target potentiometer 189, which is on a common shaft with pointer 182 is, therefore, also moved accordingly. The potentiometer 189 is connected electrically between a source of voltage and ground and the voltage picked off by the movable arm 188 is fed as an input to the electro-mechanical integrator amplifier 139 by way of contacts C, E of relay K140. Ground speed motor 60 positions movable arm 137A of spiral potentiometer 138A in accordance with ground speed and the signal tapped off by arm 137A is introduced into the target potentiometer through a circuit including contacts G, A and F, B of relay K140 so that the input to the integrator varies with estimated target speed and, because of the cross-over connection at the spiral potentiometer, inversely as aircraft ground speed. The output shaft rotation of the electro-mechanical integrator passes through spiral clutch 141 and becomes an input to differential 186. The output shaft of differential 186 drives the rotor of synchro 160 toward zero signal position at a rate proportional to target speed and inversely porportional to aircraft ground speed for a period of time determined by a timing cam 215.

Rotation of adjusting wheel 184 also appears as an input to a differential 185 as does the rotation of the ground speed motor and the output of said differential is utilized to mechanically rotate rotor 191 of a bank angle synchro 190, generating a signal in stator 192 which is applied to primary 201 of synchro differential 200. This voltage induces a signal in secondary 202 of the differential synchro which is connected to stator 212 of timing synchro 210 thereby causing a signal to appear on rotor 211. The signal from rotor 211 is amplified in a bank angle timing amplifier 213 which controls the operation of a bank angle timing motor 214. Motor 214 drives the rotor 211 to null, simultaneously positioning timing cam 215 so that the high spot of the cam moves away from switch 216 to a position determined in accordance with estimated target speed and the inverse of aircraft ground speed. This permits switch 216 to close a circuit with contact A applying power to the electro-mechanical integrator. Simultaneously with the positioning of the bank maneuvering cam 117, bank rate motor 114 turns the primary winding 201 to produce a differential signal appearing on winding 202 which is coupled to stator 212 of timing synchro 210. The voltage induced in rotor 211 of the timing synchro is put into the bank angle timing amplifier 213 which causes the operation of bank angle timing motor 214 to drive rotor 211 toward its null position and also rotates timing cam 215 which is mechanically connected thereto back toward the position shown in the drawing.

When the timing cam returns to the position shown, power is removed from the field windings of the electro-mechanical integrator so that the spiral synchro rotor will remained fixed in the position it had at that time except for changes of position caused by windage effect feedback from differential 187. The aircraft, therefore, will fly in a circle whose radius is determined by the bank angle which was being maintained at the moment the timing cam reached its switch operating position. Since the position of the timing cam is ultimately determined by target speed and ground speed, a change in ground speed will reposition the timing cam reenergizing the electro-mechanical integrator and, consequently, a ground speed feedback will be introduced at the spiral synchro. The effect of this is to maintain a circle of constant radius as originally determined with respect to the ground, regardless of changes in aircraft ground speed and/or wind. The timing cam closes the switch circuit with contact B, applying power to cam follower 94 which cooperates with equiangular cam 93. Cam 93 is coordinated with the ground track indicator so that each of the high spots on the cam indicates a fixed heading on the ground. Each of the high spots causes the cam follower to make contact with the contact 95 closing a circuit which includes indicator means such as the light 96.

When the programmer and computer is first engaged, the relays and switches in the system will be in the positions in which they are shown in the drawing. As the range of a sighted target is set on the range dial and the target cam is rotated away from its zero position, switch 74 closes applying energizing current to relay K90. The circuit to relay winding K150 through contacts C, D of relay K90 will be opened and the contacts of relay K150 will assume their unoperated positions. Under these conditions a signal taken from two of the windings of stator 162 is conducted via contacts D, H and B, G of relay K150 to a spiral reset amplifier 163 which controls the operation of spiral reset motor 164. Reset clutch 165 is energized by current supplied through contacts F, J of relay K150 so that rotation of the output shaft of motor 164 will drive rotor 161 until the spiral synchro is at null. The system is designed so that the rotor position of the spiral synchro at this null condition is such that the spiral synchro will signal to the bank rate synchro for a 30° bank when stator 162 is connected to stator 111 of the bank rate synchro. This determines the 30° bank angle which is ordered at the beginning of the programmed pattern after the aircraft has reached the zero range position.

The spiral reset mechanism is cut off when relay K150 becomes energized. This also occurs when the target cam reaches its zero range setting.

*Automatic pilot interconnections*

With the imposed bank angle limitations and roll pendulum control for coordinated turns, altitude control is adequately handled by elevator control through the automatic pilot. Electrical signals from a radio altimeter, not shown, are presented to a radio altitude amplifier 294 whose output operates radio altitude reference motor 293. The motor 293 in turn positions rotor 291 of pitch synchro 290. The stator 292 of the pitch synchro is connected in parallel with the pitch synchro 270 of the automatic pilot vertical gyroscope to pitch synchro 250 of the automatic pilot controller. With switch 303 in the automatic pilot position, as shown, relay K310 is energized via a circuit including contact C of switch 303; contacts B, D, C of relay K300; contact B of switch 303 and detent switch 311 to a power source. Therefore, the circuit from rotor 251 of the automatic pilot controller pitch synchro to the pitch channel servo-mechanism via contacts D, G of relay K310 will be open and pitch channel input is from rotor 291 of pitch synchro 290 through contacts C, G of relay K310. Similarly, the stator of bank synchro 120 is connected back to back with roll synchro 260 of the automatic pilot controller. The circuit from rotor 241 of the controller roll synchro to the roll channel servo system is open at contacts B, F of relay K310 and roll channel signals are taken from the bank synchro through contacts A, F of relay K310. Energizing current for the yaw channel control relay K119 and the course clutch is cut off at contacts E, H of relay K310 and the circuit for current to those components is now through switch 116 which is controlled by the heading cam 115. Yaw channel control relay K119 is normally energized connecting rotor 231 of yaw rate synchro 230 in the automatic pilot controller to the yaw channel servo amplifier via its contacts B, C. Whenever the heading error is other than zero, as evidenced by the position of the bank maneuvering cam and heading cam, switch 116 opens deenergizing the yaw channel control relay and switching control for the yaw channel to roll pendulum through contacts A, C of relay K119.

Detent switch 311 on the automatic pilot controller gives the pilot complete and instantaneous control of the automatic pilot when he so desires. With the automatic pilot in detent and switch 303 set for automatic pilot, holding relay K300 will be energized upon operation of the maneuver engage knob completing the energizing circuit for the automatic pilot control relay K310. This switches control of the automatic pilot from the controller to the bank synchro and the pitch synchro in the computer. At any time that the controller is taken out of detent, switch 311 opens deenergizing relay K300 and consequently, relay K310 thereby returning authority over the automatic pilot to the controller. This condition also causes the computer to reset for the next computation as described above in the section dealing with the spiral computer. Small amounts of trim may be introduced as required during the programmed maneuvers by means of the pitch and roll trim wheels of the controller without disengaging the controller from detent, in other words, without removing control over the automatic pilot from the computer.

Signals from the computer bank and pitch synchros are introduced into flight indicator roll amplifier 324 and flight indicator pitch amplifier 323 respectively. The output signals from these amplifiers are then used to control the positions of pointers 321 and 322 respectively of flight indicator 320. When the airplane is flying on the programmed course the pointers will be in their center scale positions. For manual flight or for automatic flight with manual control of the automatic pilot, switch 303 is placed in the indicator position. In this condition of operation, error signals are fed to the flight indicator amplifiers but the computer has no control over the automatic pilot. For ordinary manual flight from the visual indications, the automatic pilot is cut off by means of the conventional disconnect switch.

Lamp 302 provides a visual indication that the computer is engaged.

Obviously many modifications and variations of the present invention are possible in the light of the above teachings. It is therefore to be understood that within the scope of the appended claim the invention may be practiced otherwise than as specifically described.

What is claimed is:

Automatic programmer and computer apparatus for an aircraft comprising a ground track computer including a first servo device having an output shaft, the angular disposition of which is proportional to the ground speed of the aircraft, and a second servo device having an output shaft, the angular disposition of which is proportional to the bearing of the aircraft with respect to ground; a target cam; manual means for rotating the target cam from a first angular position that represents the position of the aircraft to a second angular position that represents the range of selected target; means responsive to the output of the first servo device for controlling the angular movement of the target cam in accordance with the change of actual distance between the aircraft and the target; a relative bearing synchro having a rotor and stator windings; manual means for rotating the rotor winding of the bearing synchro from a first angular position that represents the bearing of the aircraft when it will intercept the target to a second angular position that represents the actual bearing of the aircraft; an auto pilot mechanism that controls the direction of flight of the aircraft; means, operative when the target cam occupies a position other than its first angular position, for coupling the auto pilot mechanism to the stator windings of the bearing synchro; means responsive to the output of the second servo device for controlling the angular movement of the bearing synchro rotor winding in accordance with the change in the actual bearing of the aircraft; a spiral synchro having a rotor and stator windings; means, actuated when the target cam is operated to its first angular position, for coupling the auto pilot mechanism to the stator windings of the spiral synchro; means, operative when the target cam occupies a position other than its said first angular position, for positioning the rotor winding of the spiral synchro such that its stator winding signals for a 30° turn by the auto pilot mechanism; means, operative when the aircraft completes its first half turn, for repositioning the rotor winding of the spiral synchro such that its stator winding signals for a 15° turn by the auto pilot mechanism; and means operative when the aircraft completes its second half turn, for controlling the angular disposition of the rotor winding of the spiral synchro in accordance with the speed of the aircraft and the estimated speed of the target.

References Cited in the file of this patent

UNITED STATES PATENTS

| | | |
|---|---|---|
| 2,341,287 | Pookhir | Feb. 8, 1944 |
| 2,429,595 | Abraham | Oct. 28, 1947 |
| 2,444,171 | Sanders | June 29, 1948 |
| 2,560,527 | Dehmel | July 10, 1951 |
| 2,582,588 | Fennessy | Jan. 15, 1952 |
| 2,616,625 | Griest et al. | Nov. 4, 1952 |

OTHER REFERENCES

"Automatic Controls for Pilotless Ocean Flight" in Electronics for December 1947, pages 88–92.